(12) United States Patent
Song et al.

(10) Patent No.: US 12,514,483 B2
(45) Date of Patent: Jan. 6, 2026

(54) METHOD FOR EVALUATING PROJECTION CONTENT IN ENCLOSED ENVIRONMENT, APPARATUS, AND STORAGE MEDIUM

(71) Applicant: The Boeing Company, Chicago, IL (US)

(72) Inventors: Wenwen Song, Beijing (CN); Dan Zhang, Beijing (CN); Junwei Wang, Beijing (CN)

(73) Assignee: The Boeing Company, Arlington, VA (US)

( * ) Notice: Subject to any disclaimer, the term of this patent is extended or adjusted under 35 U.S.C. 154(b) by 998 days.

(21) Appl. No.: 17/610,745

(22) PCT Filed: Jun. 4, 2019

(86) PCT No.: PCT/CN2019/090011
§ 371 (c)(1),
(2) Date: Nov. 12, 2021

(87) PCT Pub. No.: WO2020/243910
PCT Pub. Date: Dec. 10, 2020

(65) Prior Publication Data
US 2022/0273226 A1    Sep. 1, 2022

(51) Int. Cl.
*A61B 5/378* (2021.01)
*A61B 5/00* (2006.01)
(Continued)

(52) U.S. Cl.
CPC .............. *A61B 5/378* (2021.01); *A61B 5/165* (2013.01); *A61B 5/374* (2021.01); *A61B 5/7207* (2013.01); *A61B 2503/12* (2013.01)

(58) Field of Classification Search
CPC ......... A61B 5/378; A61B 5/165; A61B 5/374; A61B 5/7207; A61B 2503/12;
(Continued)

(56) References Cited

U.S. PATENT DOCUMENTS

2014/0223462 A1* 8/2014 Aimone ................. G16Z 99/00
725/10
2015/0080675 A1 3/2015 Shin
(Continued)

FOREIGN PATENT DOCUMENTS

CN    104361356    2/2015
CN    106175799    12/2016
(Continued)

OTHER PUBLICATIONS

China National Intellectual Property Administration, Office Action, with English translation, App. No. 201980097178.3 (Sep. 19, 2023).
(Continued)

*Primary Examiner* — Tse W Chen
*Assistant Examiner* — Joseph A Tombers
(74) *Attorney, Agent, or Firm* — Walters & Wasylyna LLC

(57) ABSTRACT

The present disclosure relates to a method and a device for evaluating projection content in an enclosed environment, and a storage medium. The method comprises: acquiring electroencephalogram (EEG) data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and a corresponding weight in a plurality of weights respectively cor-
(Continued)

responding to the plurality of indexes; and evaluating the projection content using the projection content evaluation value. The method of the present disclosure can evaluate the projection content in an enclosed environment objectively, scientifically and accurately.

20 Claims, 6 Drawing Sheets

(51) Int. Cl.
  *A61B 5/16* (2006.01)
  *A61B 5/374* (2021.01)
(58) Field of Classification Search
  CPC ..... A61B 5/6814; A61B 5/7203; A61B 5/725; G06Q 30/02; H04N 21/41422; H04N 21/44218; G06F 2203/011; G06F 3/015
  See application file for complete search history.

(56) References Cited

U.S. PATENT DOCUMENTS

2015/0297109 A1* 10/2015 Garten .................... A61B 5/38 600/28
2018/0190376 A1 7/2018 Hill et al.

FOREIGN PATENT DOCUMENTS

| | | |
|---|---|---|
| CN | 108512995 | 9/2018 |
| CN | 108594989 | 9/2018 |
| CN | 109002531 | 12/2018 |
| GB | 2465439 | 5/2010 |
| JP | 2015054240 A | 3/2015 |
| JP | 2019082952 A | 5/2019 |
| KR | 1020160034227 A | 3/2016 |
| WO | WO 2019/068025 | 4/2019 |
| WO | WO 2019/087532 | 5/2019 |
| WO | WO 2019/103187 | 5/2019 |

OTHER PUBLICATIONS

European Patent Office, Extended European Search Report, App. No. 19931584.7 (Dec. 2, 2022).
China National Intellectual Property Administration, International Search Report, with English translation, App. No. PCT/CN2019/090011 (Feb. 17, 2020).
European Patent Office, "Communication pursuant to Article 94(3) EPC," App. No. 19 931 584.7 (Feb. 21, 2024).
Girton D.G. et al: "A Simple On-Line Technique for Removing Eye Movement Artifacts From the EEG," *Electroencephalography and Clinical Neurophysiology*, Elsevier, vol. 34, No. 2, pp. 212-216 (Feb. 1, 1973).
Canadian Intellectual Property Office, Office Action, App. No. 3,142,060 (Nov. 17, 2023).
Canadian Intellectual Property Office, Office Action, App. No. 3,142,060 (Sep. 6, 2024).
Zhou et al: "Automatic removal of eye movement artifacts from the EEG using ICA and dipole model," Progress in Natural Science, vol. 19, issue 9, pp. 1165-1170 (Sep. 10, 2009).
International Searching Authority: International Search Report and Written Opinion, with English translation, Intl. App. No. PCT/CN2019/090011 (Mar. 2, 2020).
International Searching Authority: International Preliminary Report on Patentability and Written Opinion, with English translation, Intl. App. No. PCT/CN2019/090011 (Dec. 16, 2021).
Canadian Intellectual Property Office, Office Action, App. No. 3,142,060 (Jan. 12, 2023).
China National Intellectual Property Administration, Office Action, with English translation, App. No. 2019800971783 (Aug. 14, 2024).
Japan Patent Office, Office Action, App. No. 2021-567873 (Mar. 15, 2023).

* cited by examiner

METHOD FOR EVALUATING PROJECTION CONTENT IN ENCLOSED ENVIRONMENT, APPARATUS, AND STORAGE MEDIUM

This application is the U.S. national phase entry of Intl. App. No. PCT/CN2019/090011 filed on Jun. 4, 2019.

TECHNICAL FIELD

The present disclosure relates to the technical field of projection content evaluation, more particularly, to a method and a device for evaluating projection content in an enclosed environment, and a machine readable storage medium.

BACKGROUND

With the maturity of projection technology, in enclosed environments such as hotels, trains, cruise ships, business aircraft cabins, there are requirements for enhancing visual presentation, creating personalized virtual scenes, and bringing new experiences for passengers. A simple projection system displays any views on the ceiling, and the airline can utilize this function to improve passenger experiences, such as projecting a blue sky during mealtimes and projecting a night sky during breaks, for relieving the depressed cabin environment. Use of advanced projection technology can create a more realistic visual experience.

In terms of projection content design, basic design elements such as hue, brightness, contrast, and field of view (FOV) factors are the primary consideration factors in the projection content design. Projection content comprising different basic design elements has different influences on the creation of the enclosed environment and the psychological and physiological states of users. In order to provide the users with a better experience, there is a need to evaluate the projection content according to the experiences and feelings generated by the users when watching the projection content.

However, the existing experience evaluation method with regard to video contents mainly relies on interview or questionnaire data of the audiences, and such methods have problems that the results are greatly influenced by subjective factors, such as the question designs of the interview or questionnaire are subjective and the audiences have a herd mentality. In addition, users also have concerns about the personal privacy protection of these methods.

SUMMARY

Thus, in order to solve these problems above in the prior art, there is a need to establish a more objective and accurate projection content evaluation method.

Brain-computer interaction technology is an engineering psychology technology which judges the human thinking activity state by means of directly interpreting electroencephalograms (EEGs) of the brain wave generated by human brain thinking activities. The inventors of the present disclosure have found that when a person is watching a projection content, the human brain will generate thinking activities related to the projection content; by means of collecting EEG signals generated by these thinking activities and interpreting different emotional experience states of the person according to these EEG signals, the projection content can be evaluated. Compared with the existing methods, the brain-computer interaction technology relies on objective cranial nerve electrical activity information for experience analysis, and thus the evaluation on the projection content is more objective and accurate.

According to one aspect of the present disclosure, there is provided a method for evaluating projection content in an enclosed environment, comprising: acquiring EEG data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and corresponding weight in a plurality of weights respectively corresponding to the plurality of indexes; and evaluating the projection content using the projection content evaluation value.

According to an exemplary embodiment of the present disclosure, before extracting feature of the acquired EEGs at each of the predetermined regions so as to obtain EEG energy values of a plurality of frequency bands of the EEGs at each of the predetermined regions, the method further comprises: performing preprocessing including eye-movement noise removal on the EEG data.

According to an exemplary embodiment of the present disclosure, calculating the projection content evaluation value according to each of the plurality of EEG energy values and corresponding weight in a plurality of weights respectively corresponding to the plurality of indexes comprises: multiplying each of the plurality of EEG energy values by corresponding weight in a plurality of weights respectively corresponding to the plurality of indexes and accumulating the multiplication results of the plurality of EEG energy values, so as to calculate the projection content evaluation value for evaluating the projection content.

According to an exemplary embodiment of the present disclosure, the indexes may comprise at least one of the following: emotional valence index, emotional arousal index, concentration index, fatigue index, motion sickness index, and preference index.

According to an exemplary embodiment of the present disclosure, the frequency bands may comprise at least one of the following: a theta frequency band with a frequency range of 4-7 Hz, an alpha frequency band with a frequency range of 8-13 Hz, a beta frequency band with a frequency range of 14-28 Hz, and a gamma frequency band with a frequency range of 29-50 Hz.

According to an exemplary embodiment of the present disclosure, the correlations between the EEG energy values and indexes for evaluating the projection content may comprise at least one of the following: the asymmetry between the EEG energy values of alpha frequency band at the left prefrontal region and the EEG energy values of alpha frequency band at the right prefrontal region corresponding to the emotional valence index; the EEG energy values of alpha frequency band at the occipital region corresponding to the emotional arousal index; the EEG energy values of theta frequency band at the left prefrontal region and the EEG energy values of theta frequency band at the right prefrontal region together corresponding to the concentration index; the average EEG energy value of alpha frequency band at the parietal-occipital region corresponding to the fatigue index, wherein the average EEG energy value is the average value of the EEG energy values of alpha frequency band of all the EEGs collected at the parietal-occipital region; the EEG energy values of gamma frequency band at the occipital region corresponding to the motion sickness index; and the EEG energy values of theta frequency band at the right temporal region corresponding to the preference index.

According to an exemplary embodiment of the present disclosure, when the projection content comprises a plurality of different projection contents, the optimal projection content in the plurality of different projection contents is determined according to the projection content evaluation value of each of the plurality of different projection contents.

According to an exemplary embodiment of the present disclosure, the differences between the plurality of different projection contents at least comprise one of the following items of the projection content: hue, brightness, contrast, amplitude, transition rate, and complexity representing the number of the foregoing items.

According to an exemplary embodiment of the present disclosure, the predetermined regions may comprise one of the following regions: frontal region, parietal region, temporal region, and occipital region of the brain.

According to an exemplary embodiment of the present disclosure, the predetermined regions may comprise one of the following regions: left prefrontal region, right prefrontal region, parietal-occipital region, and right temporal region.

According to another aspect of the present disclosure, there is provided a device for evaluating projection content in an enclosed environment, comprising: an EEG data acquisition module, configured to acquire EEG data at a plurality of predetermined regions of the brain of a user, the EEG data being collected during the user watching the projection content; a feature extraction module, configured to extract feature of the acquired EEGs at each of the predetermined regions, so as to obtain EEG energy values of a plurality of frequency bands of the EEGs at each of the predetermined regions; an EEG energy value determination module, configured to determine, from the extracted EEG energy values, a plurality of EEG energy values respectively corresponding to a plurality of indexes for evaluating the projection content according to the correlations between the EEG energy values and the indexes; a projection content evaluation value calculation module, configured to calculate a projection content evaluation value according to each of the plurality of EEG energy values and corresponding weight in a plurality of weights respectively corresponding to the plurality of indexes; and a projection content evaluation module, configured to evaluate the projection content using the projection content evaluation value.

According to an exemplary embodiment of the present disclosure, the device may further comprise a preprocessing module configured to perform preprocessing including eye-movement noise removal on the EEG data.

According to an exemplary embodiment of the present disclosure, the projection content evaluation value calculation module is further configured to: multiply each of the plurality of EEG energy values by corresponding weight in a plurality of weights respectively corresponding to the plurality of indexes and accumulate the multiplication results of the plurality of EEG energy values, so as to calculate the projection content evaluation value for evaluating the projection content.

According to still another aspect of the present disclosure, there is provided a machine readable storage medium, the machine readable storage medium having a computer program comprising program instructions stored thereon, wherein the program instructions are used for performing, when being executed by a processor, the method as described above.

According to still another aspect of the present disclosure, there is provided a processor, the processor being used for executing a program, wherein the program is used for performing, when being executed, the method as described above.

According to still another aspect of the present disclosure, there is provided a device for evaluating projection content in an enclosed environment, comprising: a memory and a processor, the processor being connected to the memory, the memory having program instructions performed by the processor stored therein, wherein when the processor performs the program instructions, the processor can perform the method as described above.

According to still another aspect of the present disclosure, there is provided a system for evaluating projection content in an enclosed environment, comprising: an EEG collection device, for collecting EEG data at a plurality of predetermined regions of the brain of a user during the user watching the projection content; and a device as described above for evaluating projection content in an enclosed environment.

According to still another aspect of the present disclosure, there is provided a computer program product, the computer program product comprising a computer program stored on a non-transitory computer readable storage medium, the computer program comprising program instructions for causing, when being executed by a computer, the computer to perform the method as described above.

In embodiments of the present disclosure, the EEG energy values are obtained by means of the brain-computer interaction technology acquiring, analyzing, and feature-extracting EEG data, EEG energy value corresponding to each of the indexes for evaluating the projection content is selected on the basis of the correlations between the EEG energy values and the indexes, and the projection content evaluation value for evaluating the projection content is calculated on the basis of the selected EEG energy values. The whole process only involves acquisition, analysis and processing of the EEG data, and thus, compared with the prior art, the projection content in an enclosed environment can be evaluated objectively, scientifically and accurately.

In addition, by means of evaluating and analyzing different projection contents, the correlations between the influence factors or basic design elements in the projection content and the evaluation results can be obtained, thereby being able to establish a guideline for the design of the projection content.

BRIEF DESCRIPTION OF THE DRAWINGS

The drawings illustrated herein, constituting a part of the present disclosure, are used for providing further understanding of the present disclosure. The illustrative embodiments of the present disclosure and illustrations thereof are used for explaining the present disclosure, rather than constitute inappropriate limitation on the present disclosure. In the drawings.

DETAILED DESCRIPTION

Figure 1:
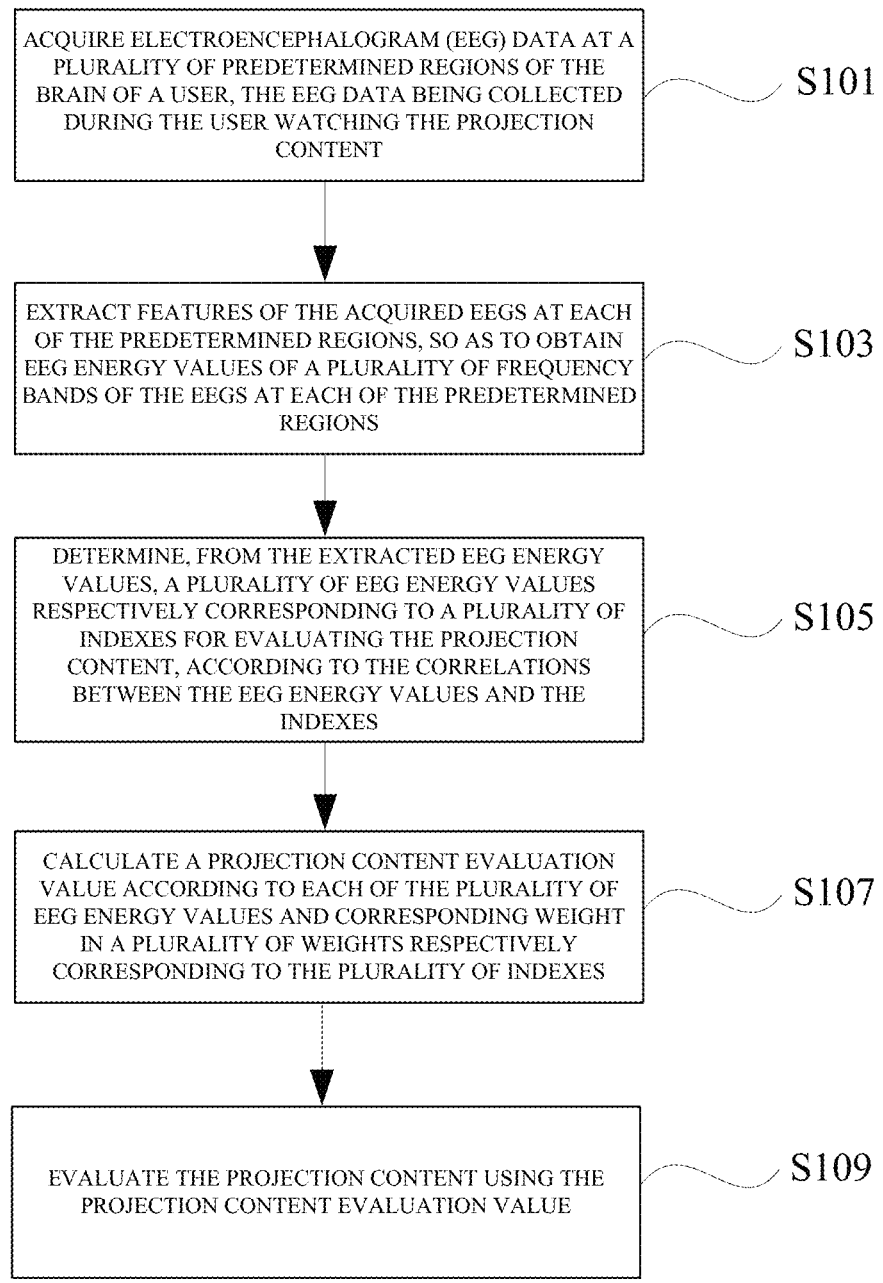
FIG. 1 is a flowchart of a method for evaluating projection content in an enclosed environment according to an embodiment of the present disclosure.

In order to enable a person with ordinary skill in the art to better understand solutions of the present disclosure, hereinafter, the technical solutions of the embodiments of the present disclosure will be described clearly and completely in combination with the drawings in the embodiments of the present disclosure. Obviously, the described embodiments are just a part but not all of the embodiments of the present disclosure. The following exemplary embodiments merely explain the principle of the disclosure, but not limit the scope of the disclosure. On the basis of the embodiments of the present disclosure, all other embodiments obtained by a person with ordinary skill in the art without any inventive effort shall fall within the scope of protection of the present disclosure.

It is to be illustrated that, the terms "first", "second", etc. in the description, claims and the drawing of the present disclosure are used to distinguish similar objects, but not necessarily used to describe specific sequence or precedence order. It is to be understood that data used in such a way can be exchanged in appropriate situations, such that the embodiments of the present disclosure described herein can be implemented in sequences other than those diagrammed or described herein. In addition, the terms "comprising" and "having" and any variations thereof are intended to cover a non-exclusive inclusion. For example, a process, method, system, product, or device that comprises a series of steps or modules or units is not necessarily limited to those steps or modules or units clearly listed, but may include other steps or modules or units not clearly listed or inherent to such process, method, product, or device.

According to an embodiment of the present disclosure, there is provided a method for evaluating projection content in an enclosed environment. FIG. 1 is a flowchart of the method for evaluating projection content in an enclosed environment according to an embodiment of the present disclosure. As shown in FIG. 1, the method for evaluating projection content in an enclosed environment according to embodiments of the present disclosure comprises: step S101, acquiring EEG data at a plurality of predetermined regions of the brain of a user, the EEG data being collected during the user watching the projection content; step S103, extracting feature of the acquired EEGs at each of the predetermined regions, so as to obtain EEG energy values of a plurality of frequency bands of the EEGs at each of the predetermined regions; step S105, determining, from the extracted EEG energy values, a plurality of EEG energy values respectively corresponding to a plurality of indexes for evaluating the projection content according to the correlations between the EEG energy values and the indexes; step S107, calculating a projection content evaluation value according to each of the plurality of EEG energy values and corresponding weight in a plurality of weights respectively corresponding to the plurality of indexes; and step S109, using the projection content evaluation value to evaluate the projection content.

In step S101, EEG data at a plurality of predetermined regions of the brain of a user is acquired, the EEG data being collected during the user watching the projection content. Specifically, in enclosed environments such as hotels, trains, cruise ships, business aircraft cabins, the projection content can be projected onto a projection position by means of a projection device. The projection content may comprise specially designed projection videos, and factors considered when designing the projection content will be detailed below. An EEG collection device, for example, a dry electrode EEG collection device (for example, commercially-available devices, e.g. DSI-24) is placed on the head of the user, for collecting EEG data at a plurality of predetermined regions (for example, frontal region, parietal region, temporal region, and occipital region) of the brain under the condition that the user watches the projection content. Preferably, the EEG data at the left prefrontal region, right prefrontal region, parietal-occipital region, and right temporal region of the brain can be collected, but this is not restrictive, and EEG data at other positions of the brain can also be collected. The collected EEG data can be stored in a local memory or directly sent to the next stage for preprocessing.

In step S103, feature of the acquired EEGs at each of the predetermined regions is extracted, so as to obtain EEG energy values of a plurality of frequency bands of the EEGs at each of the predetermined regions. Specifically, a fast Fourier transform (FFT) is performed on the acquired EEG data at the predetermined regions by means of FFT algorithm, the EEG data is transformed from time domain to frequency domain, and the EEG data at each of the predetermined regions is processed in the frequency domain so as to extract EEG energy values of a plurality of frequency bands.

In step S105 a plurality of EEG energy values respectively corresponding to a plurality of indexes for evaluating the projection content are determined from the extracted EEG energy values, according to the correlations between the EEG energy values and the indexes. Specifically, the applicant has found that the EEG energy values of predetermined frequency bands at the predetermined regions have correlations with emotional valence, emotional arousal, concentration, fatigue, motion sickness, and preference, etc. When the emotional valence, emotional arousal, concentration, fatigue, motion sickness, and preference, etc. are used for evaluating the projection content, these indexes can be represented by the EEG energy values of specific frequency band at the predetermined regions, and corresponding EEG energy values can be used for evaluating the projection content. Thus, a plurality of EEG energy values corresponding to the plurality of indexes for evaluating the projection content are determined from the extracted EEG energy values according to the correlations between the EEG energy values and the indexes above.

In step S107 a projection content evaluation value is calculated according to each of the plurality of EEG energy values and corresponding weight in a plurality of weights respectively corresponding to the plurality of indexes. Specifically, as described above, each predetermined EEG energy value can be used for representing a projection content evaluation index corresponding thereto. Under different projection scenes of the projection content, the number and importance degree of the indexes for evaluating the projection content are different, and thus the final influence on the projection content evaluation value for evaluating the projection content is different. Thus, when evaluating the projection content, the weights of the indexes for evaluating the projection content are set, wherein the weights vary in different scenes, for example, in a takeoff scene expecting passengers to pay attention, the concentration is given a positive weight, and in a break scene expecting passengers to relax, the concentration is given a negative weight. Thus, the projection content evaluation value is calculated according to each of the plurality of EEG energy values and corresponding weight in a plurality of weights respectively corresponding to the plurality of indexes.

In step S109, the projection content is evaluated using the projection content evaluation value. The projection content evaluation value represents numeric projection content evaluation, the higher the value is, the more preferable the projection content is, and thus, the projection content can be evaluated using the projection content evaluation value.

The present disclosure provides a method for evaluating projection content in an enclosed environment based on brain-computer interaction, comprising: setting a plurality of indexes, acquiring EEG energy values respectively corresponding to the indexes, and acquiring a projection content evaluation value for evaluating the projection content on the basis of the EEG energy values. The whole process is performed by computer tools such as Matlab, and thus immersive projection content in an aircraft cabin, etc. can be evaluated objectively, scientifically and accurately.

Figure 2:
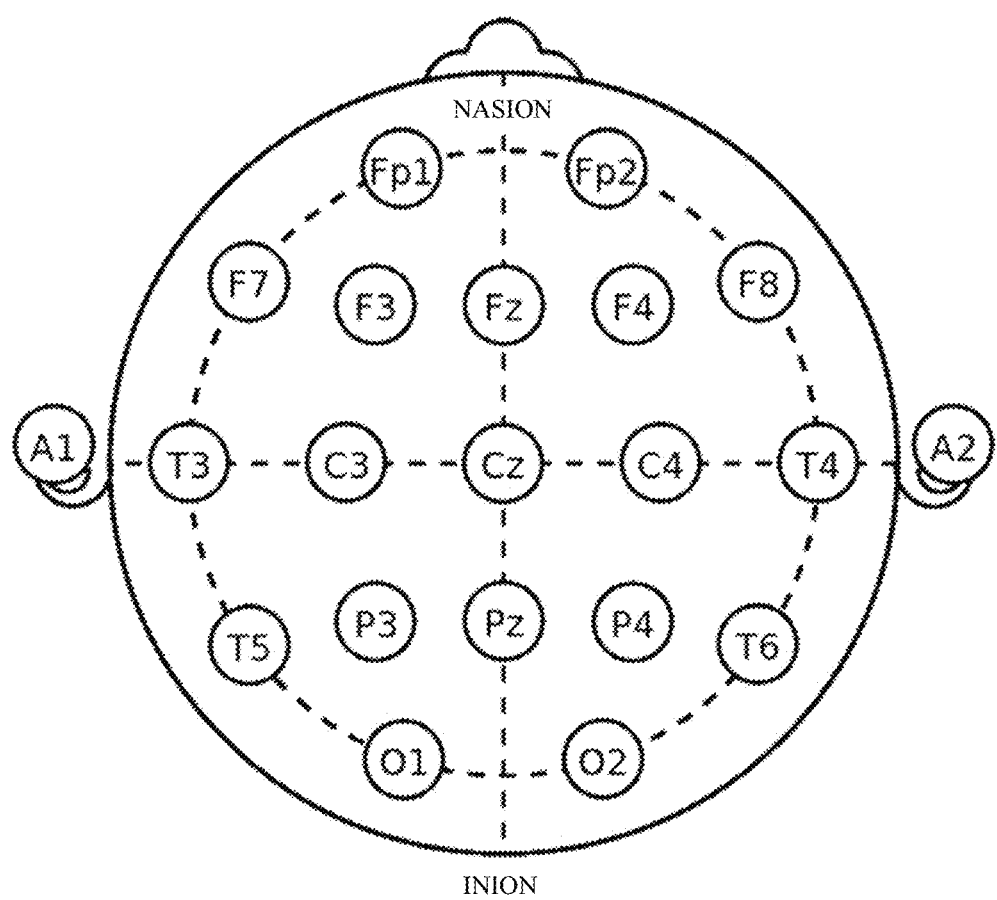
FIG. 2 is a schematic view showing an electrode placement method of the EEG collection device according to an exemplary embodiment of the present disclosure.

According to an exemplary embodiment of the present disclosure, there is provided an electrode placement method when the EEG collection device collects EEGs. FIG. 2 is a schematic view showing the electrode placement of the EEG collection device according to an exemplary embodiment of the present disclosure. The electrode placement method as shown in FIG. 2 is a standard electrode placement method prescribed by international EEG association—10/20 system electrode placement method. In addition, other EEG electrode placement method can also be used, for example, the electrode placement method recommended by International Federation of Clinical Neurophysiology (IFCN).

In an exemplary embodiment of the present disclosure, before extracting feature of the EEGs, the method may further comprise: performing preprocessing including eye-movement noise removal on the EEG data. Specifically, after the EEG collection device collects original EEG data, before performing feature extraction on the EEG data, the original EEG data can be preprocessed on the basis of Fieldtrip toolkit under a Matlab environment. It is to be illustrated, the Fieldtrip toolkit is a common platform provided for experimenters and method developers. The Fieldtrip toolkit provides experimenters with advanced data analysis logics. The logics thereof are also applied in various experimental data. Preprocessing the original EEG data further comprises: performing filtering-out of frequencies of specific frequency band in the signal and noise removal on the original EEG data. Specifically, the original EEG data is subjected to 0.05-50 Hz filtering (wave filtering) by means of a band-pass filter, and the eye-movement noise is removed by means of the ICA method. The originally processed EEG data may be EEG data under the feeling of the user in the immersive projection content in any of the aircraft cabins.

In an exemplary embodiment of the present disclosure, calculating a projection content evaluation value according to each of the plurality of EEG energy values and corresponding weight in a plurality of weights respectively corresponding to the plurality of indexes comprises multiplying each of the plurality of EEG energy values by corresponding weight in a plurality of weights respectively corresponding to the plurality of indexes and accumulating the multiplication results of the plurality of EEG energy values, so as to calculate the projection content evaluation value for evaluating the projection content. The projection content evaluation value is acquired by means of multiplying the EEG energy values respectively corresponding to the plurality of indexes by the corresponding weights and then accumulating the multiplication results one by one; the projection content evaluation value synthesizes the evaluation results of all the indexes, and thus it is possible to comprehensively evaluate the projection content.

Figure 3:
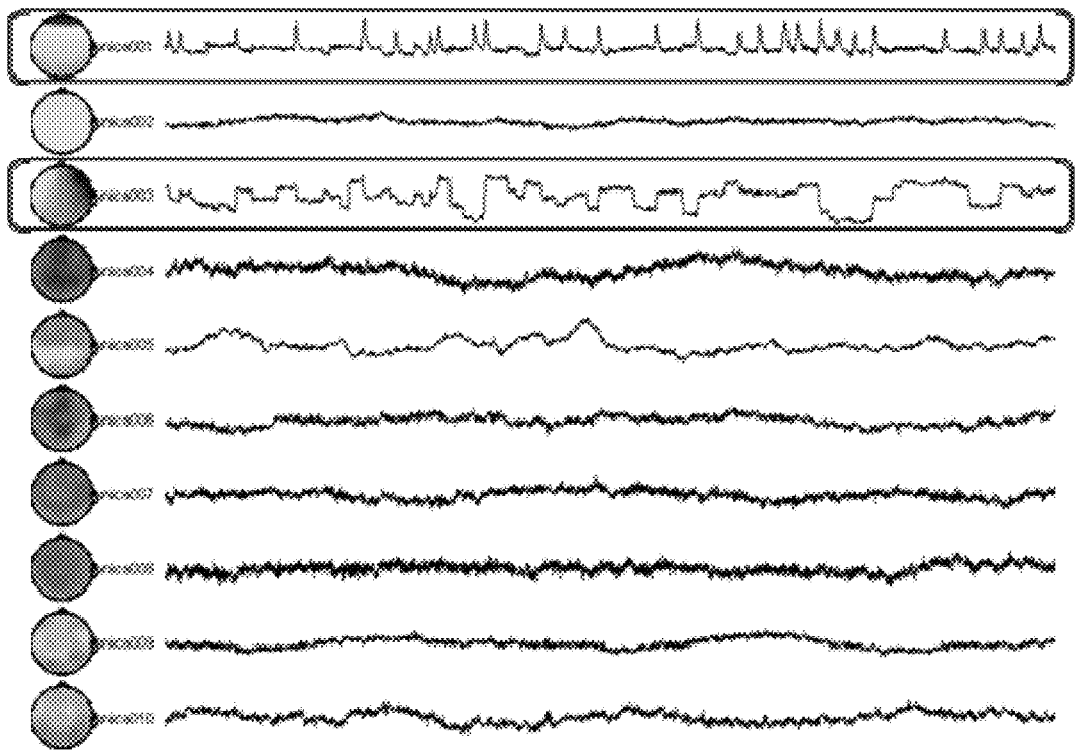
FIG. 3 is a schematic view showing the analysis result of removing eye-movement noise using an independent component analysis (ICA) method according to an exemplary embodiment of the present disclosure.
Figure 4:
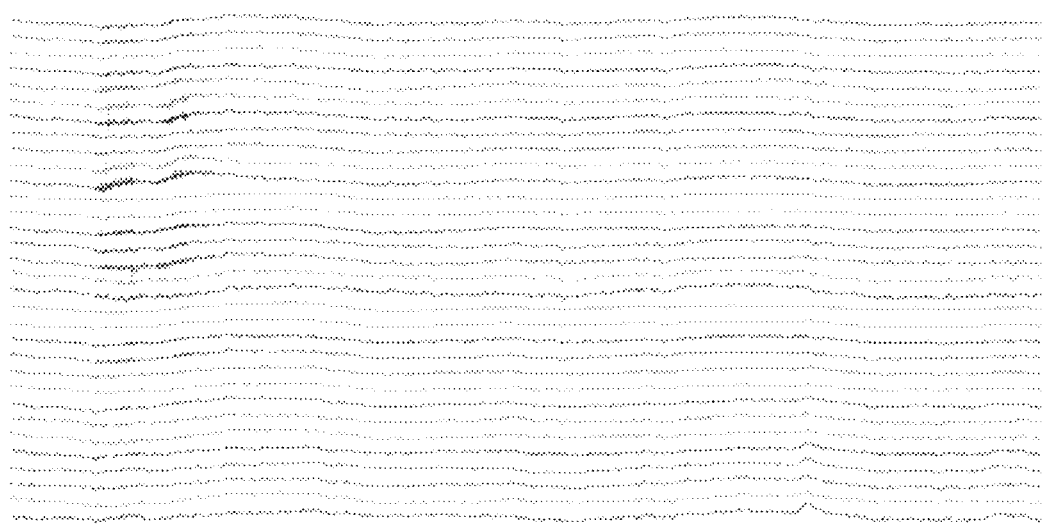
FIG. 4 is a schematic view showing the EEG signals after removing eye-movement noise using the ICA method according to an exemplary embodiment of the present disclosure.
Figure 5:
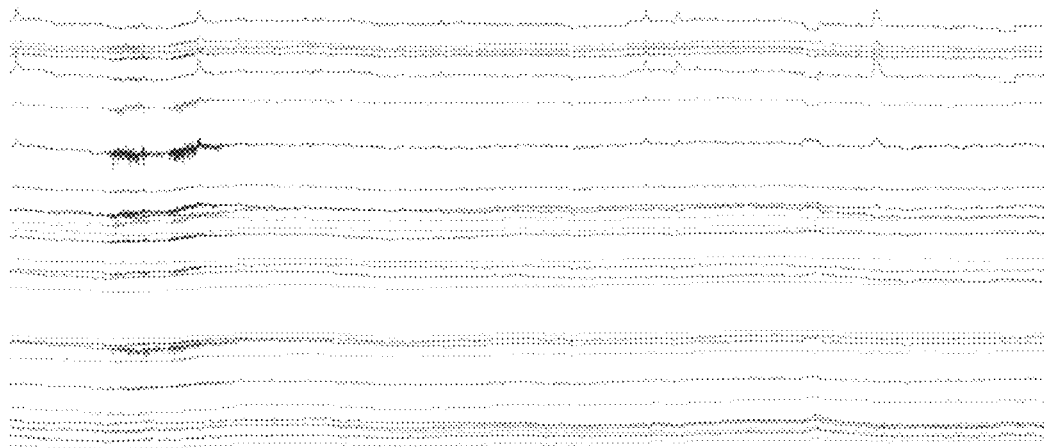
FIGS. 5 and 6 respectively show EEG signals before and after a band-pass filter filters the original EEG data according to an exemplary embodiment of the present disclosure.
Figure 6:
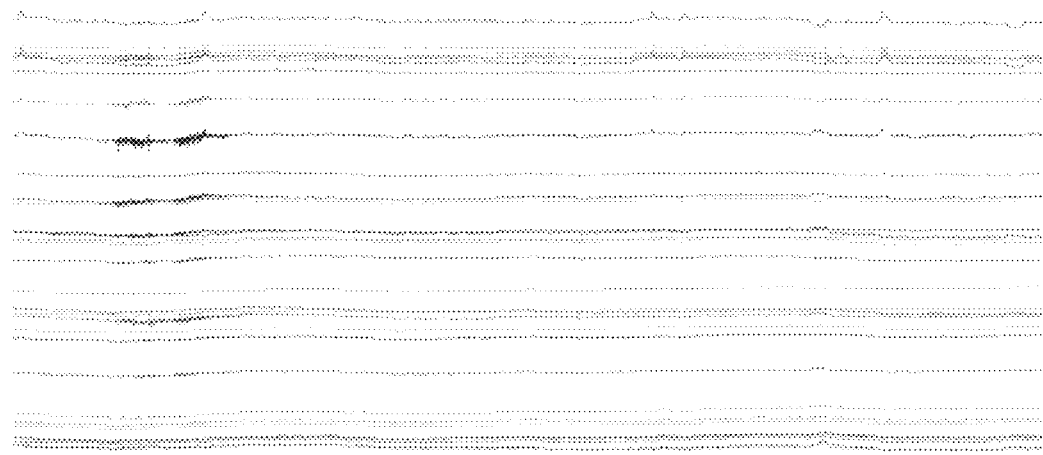

FIG. 3 is a schematic view showing the analysis result of removing eye-movement noise using an ICA method according to an exemplary embodiment of the present disclosure. As shown in FIG. 3, components circled by rectangular boxes are eye-movement noises to be removed. FIG. 4 is a schematic view showing the EEG signals after removing eye-movement noise using the ICA method according to an exemplary embodiment of the present disclosure. As shown in FIG. 4, the eye-movement noise has been removed. FIGS. 5 and 6 respectively show EEG signals before and after a band-pass filter filters the original EEG data according to an exemplary embodiment of the present disclosure.

In an exemplary embodiment of the present disclosure, the indexes may include at least one of the following: emotional valence index, emotional arousal index, concentration index, fatigue index, motion sickness index, and preference index. The emotional valence index is an index whether the emotion is positive. The emotional arousal index is an index representing the degree of excitement of the emotion.

In an exemplary embodiment of the present disclosure, the frequency bands may comprise at least one of the following: a theta frequency band with a frequency range of 4-7 Hz, an alpha frequency band with a frequency range of 8-13 Hz, a beta frequency band with a frequency range of 14-28 Hz, and a gamma frequency band with a frequency range of 29-50 Hz. On the basis of the embodiments above, the EEG energy values of theta, alpha, beta, and gamma frequency bands at the frontal region, parietal region, temporal region, and occipital region of the brain are extracted by means of FFT, but the extracted EEG energy values of theta, alpha, beta, and gamma frequency bands are only one preferred embodiment of exemplary embodiments of the present disclosure, and the present disclosure may further comprise embodiments extracting EEG energy values of other frequency bands.

In an exemplary embodiment of the present disclosure, the correlations between the EEG energy values and the indexes for evaluating the projection content comprise at least one of the following: the asymmetry (or inequality) between the EEG energy values of alpha frequency band at the left prefrontal region and the EEG energy values of alpha frequency band at the right prefrontal region corresponding to the emotional valence index, wherein the greater the asymmetry between the EEG energy values is, the higher the emotional valence index is; the EEG energy values of alpha frequency band at the occipital region corresponding to the emotional arousal index, wherein the lower the EEG energy values of alpha frequency band at the occipital region are, the higher the emotional arousal index is; the EEG energy values of theta frequency band at the left prefrontal region and the EEG energy values of theta frequency band at the right prefrontal region together corresponding to the concentration index, wherein the higher both the EEG energy values of theta frequency band at the left prefrontal region and the EEG energy values of theta frequency band at the right prefrontal region are, the higher the concentration index is; the average EEG energy value of alpha frequency band at the parietal-occipital region corresponding to the fatigue index, wherein the average EEG energy value is the average value of the EEG energy values of alpha (8-13 Hz) frequency band of all the EEGs collected at the parietal-occipital region, and wherein the higher the average EEG energy value of alpha frequency band at the parietal-occipital region is, the higher the fatigue index is; the EEG energy values of gamma frequency band at the occipital region corresponding to the motion sickness index, wherein the higher the EEG energy values of gamma frequency band at the occipital region are, the higher the motion sickness index is; and the EEG energy values of theta frequency band at the right temporal region corresponding to the preference index, wherein the higher the EEG energy values of theta frequency band at the right temporal region are, the higher the preference index is. In exemplary embodiments of the present disclosure, according to characteristics of EEG energy values of the frequency bands, the EEG energy values of different frequency bands correspond to different indexes above, and thus it is possible to represent the evaluation result for evaluating the projection content more scientifically and objectively.

In an exemplary embodiment of the present disclosure, when the projection content comprises a plurality of different projection contents, determining the optimal projection content in the plurality of different projection contents according to the projection content evaluation value of each of the plurality of different projection contents. The projection content evaluation value represents numeric projection content evaluation, and the higher the value is, the more preferable the projection content is. Thus, the optimal projection content can be chosen from the plurality of different projection contents according to the projection content evaluation values. In exemplary embodiments, before playing back the projection content by means of projection, a plurality of different projection contents are acquired by means of programming languages, preferably, 48 projection contents.

In an exemplary embodiment of the present disclosure, the differences between the plurality of different projection contents comprise at least one of the following evaluation influence factors of the projection content: hue, brightness, contrast, amplitude, transition rate, complexity representing the number of the foregoing factors, FOV and basic design elements. In exemplary embodiments, acquiring a plurality of projection contents further comprises determining the evaluation influence factors above.

Figure 7:
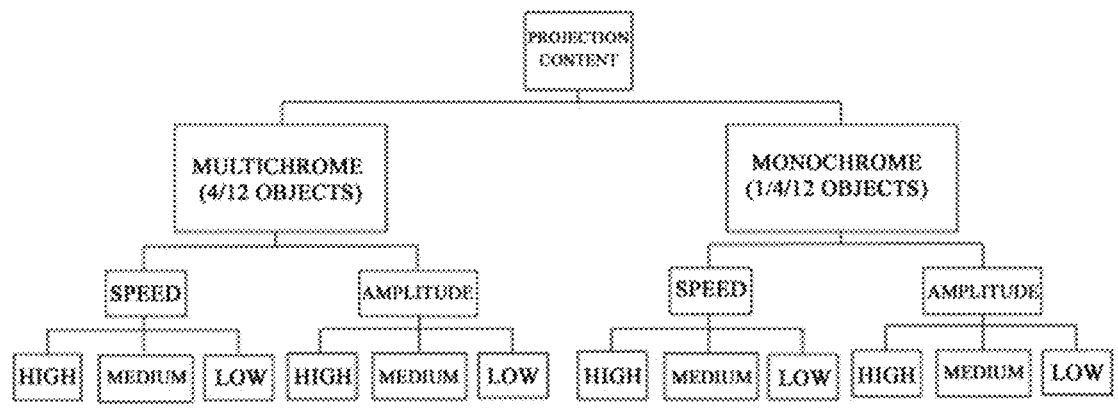
FIG. 7 is a schematic view showing 48 projection content schemes according to an exemplary embodiment of the present disclosure.

FIG. 7 is a schematic view showing 48 projection content schemes according to an exemplary embodiment of the present disclosure. As shown in FIG. 7, two hues (monochrome/multichrome), two contrasts (high/low), three amplitudes or speed levels (high/medium/low), and three complexity levels (1 object/4 objects/12 objects) are specifically considered. Different combinations of a plurality of evaluation influence factors are synthesized, and there are 48 projection schemes in total.

During evaluating the projection content, the applicant has found that the turning point of fatigue appeared at about 477 s, that is to say, after 8 minutes, it is difficult for people to concentrate on watching the projection content. Thus, it is suggested to convey all important information within the first 8 minutes.

In addition, by means of changing the evaluation influence factors above of the projection content and performing projection evaluation on the projection content before and after changing, the following characteristics of the influence factors can be obtained: hue: compared with monochrome, a multichrome design can induce more positive emotions and meanwhile can also reduce interference; and speed: heart rate analysis result shows that higher speed induces higher excitement emotion, but lower speed can help people calm down.

The optimal results in exemplary embodiments of the present disclosure are specifically as shown in the following table 1:

TABLE 1

| Design Elements | Recommended Parameters | Reasons |
| --- | --- | --- |
| Amplitude | Low or medium | Loved by people and enhance concentration |
| Brightness | Low | Reduce fatigue |
| Hue | Multichrome | Enhance positive emotion and enhance concentration |
| Contrast | Select according to situations | High contrast brings freshness, and low contrast increases fatigue |
| Complexity | Medium | Enhance positive emotion, reduce sickness, and loved by people |
| Speed | Select according to situations | High speed makes people excited, and low speed makes people calm down |
| Transition rate | Medium | Loved by people |

By means of specific analysis above, the applicant has found that adding immersive projection content in the aircraft cabin is very necessary, and the reasons are that the projection content relieves fatigue during long-distance flight and facilitates emotion regulation. In consideration of the limited cabin environment, the optimal position for projection should be the cabin roof. From the perspective of the airline, it is suggested that the projection position should be located on the main boarding gate, comprising floor of the main boarding gate.

When adding immersive projection content in the aircraft cabin, the projection color should not be too strong or too irritating, and a low-contrast color will make people more comfortable, and in general, a quiet and soothing environment needs to be created. Projection content with colors of strong contrasts and relatively warm images can also be considered in the vicinity of bar counters of some airlines, which is suitable for creating a happy atmosphere. As for speed, as images of high speed make people excited and images of low speed make people calm down, low speed is more suitable for establishing a quiet and smoothing environment for passengers. As for amplitude, a low amplitude or medium amplitude is required, as the low amplitude or medium amplitude is favored by aircraft passengers, and the concentration can be enhanced. Images with low contrast make people more comfortable, which is suitable for the comfortable rest of the aircraft passengers.

Figure 8:
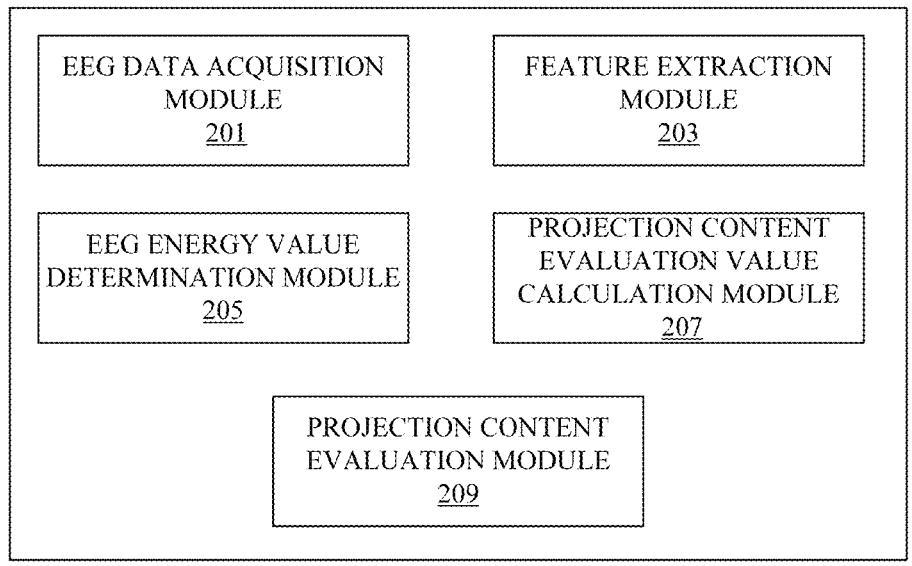
FIG. 8 is a block diagram of a device for evaluating projection content in an enclosed environment according to an embodiment of the present disclosure.

According to an embodiment of the present disclosure, there is provided a device for evaluating projection content in an enclosed environment. FIG. 8 is a block diagram of the device for evaluating projection content in an enclosed environment according to an embodiment of the present disclosure. As shown in FIG. 8, the device 20 for evaluating projection content in an enclosed environment comprises: an EEG data acquisition module 201, configured to acquire EEG data at a plurality of predetermined regions of the brain of a user, the EEG data being collected during the user watching the projection content; a feature extraction module 203, configured to extract feature of the acquired EEGs at each of the predetermined regions, so as to obtain EEG energy values of a plurality of frequency bands of the EEGs at each of the predetermined regions; an EEG energy value determination module 205, configured to determine, from the extracted EEG energy values, a plurality of EEG energy values respectively corresponding to a plurality of indexes for evaluating the projection content according to the correlations between the EEG energy values and the indexes; a projection content evaluation value calculation module 207, configured to calculate a projection content evaluation value according to each of the plurality of EEG energy values and corresponding weight in a plurality of weights respectively corresponding to the plurality of indexes; and a projection content evaluation module 209, configured to use the projection content evaluation value to evaluate the projection content. As the device for evaluating projection content in an enclosed environment corresponds to the method for evaluating projection content in an enclosed environment, the contents above will not be repeated herein.

In an exemplary embodiment of the present disclosure, the device 20 further comprises: a preprocessing module (not shown), configured to perform preprocessing including eye-movement noise removal on the EEG data. As the preprocessing module corresponds to the preprocessing step, the contents above will not be repeated herein.

In an exemplary embodiment of the present disclosure, the projection content evaluation value calculation module is further configured to multiply each of the plurality of EEG energy values by corresponding weight in a plurality of weights respectively corresponding to the plurality of indexes and accumulate the multiplication results of the plurality of EEG energy values, so as to calculate the projection content evaluation value for evaluating the projection content. As the function of the projection content evaluation value calculation module corresponds to the processing step above, the contents above will not be repeated herein.

Figure 9:
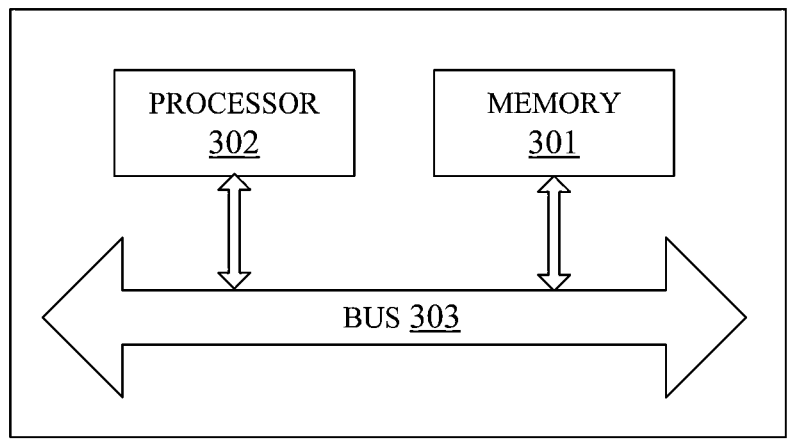
FIG. 9 is a block diagram of a device for evaluating projection content in an enclosed environment according to another embodiment of the present disclosure.

According to another embodiment of the present disclosure, there is provided a device for evaluating projection content in an enclosed environment. FIG. 9 is a block diagram of the device for evaluating projection content in an enclosed environment according to another embodiment of the present disclosure. As shown in FIG. 9, the device 30 for evaluating projection content in an enclosed environment comprises: a memory 301 and a processor 302, the processor being connected to the memory by means of a bus 303, etc., wherein the memory has program instructions performed by the processor stored therein, and when the processor performs the program instructions, the processor can perform the method for evaluating projection content in an enclosed environment according to any of the embodiments above; for example, the method comprises: acquiring EEG data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and corresponding weight in a plurality of weights respectively corresponding to the plurality of indexes; and using the projection content evaluation value to evaluate the projection content.

Figure 10:
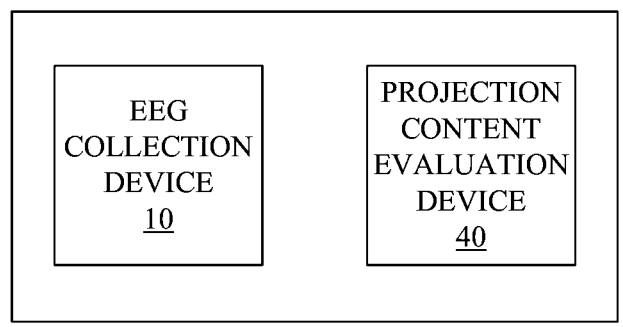
FIG. 10 is a block diagram of a system for evaluating projection content in an enclosed environment according to an embodiment of the present disclosure.

According to an embodiment of the present disclosure, there is provided a system for evaluating projection content in an enclosed environment. FIG. 10 is a block diagram of the system for evaluating projection content in an enclosed environment according to an embodiment of the present disclosure. As shown in FIG. 10, a system 1 for evaluating projection content in an enclosed environment comprises: an EEG collection device 10, for collecting EEG data at a plurality of predetermined regions of the brain of a user during the user watching the projection content; and a projection content evaluation device 40, which can be the device 20 or 30 above for evaluating projection content in an enclosed environment.

According to an embodiment of the present disclosure, there is provided a processor, the processor being used for executing a program, wherein when the program is executed, the method for evaluating projection content in an enclosed environment according to any one of the embodiments above is performed; for example, the method comprises: acquiring EEG data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and corresponding weight in a plurality of weights respectively corresponding to the plurality of indexes; and using the projection content evaluation value to evaluate the projection content.

According to an embodiment of the present disclosure, there is provided a machine readable storage medium, the machine readable storage medium having a computer program comprising program instructions stored thereon, wherein when the program instructions are executed by the processor, the method for evaluating projection content in an enclosed environment according to any one of the embodiments above is performed; for example, the method comprises: acquiring EEG data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and corresponding weight in a plurality of weights respectively corresponding to the plurality of indexes; and using the projection content evaluation value to evaluate the projection content.

According to an embodiment of the present disclosure, there is provided a computer program product, the computer program product comprising a computer program stored on a non-transitory computer readable storage medium, the computer program comprising program instructions, wherein when the program instructions are executed by a computer, the computer is caused to perform the method for evaluating projection content in an enclosed environment according to any one of the embodiments above; for example, the method comprises: acquiring EEG data at a plurality of predetermined regions of the brain of a user, the EEG data being collected during the user watching the projection content; extracting feature of the acquired EEGs at each of the predetermined regions, so as to obtain EEG energy values of a plurality of frequency bands of the EEGs at each of the predetermined regions; determining, from the extracted EEG energy values, a plurality of EEG energy values respectively corresponding to a plurality of indexes for evaluating the projection content according to the correlations between the EEG energy values and the indexes; calculating a projection content evaluation value according to each of the plurality of EEG energy values and corresponding weight in a plurality of weights respectively corresponding to the plurality of indexes; and using the projection content evaluation value to evaluate the projection content.

In the embodiments above of the present disclosure, the descriptions of various embodiments have particular emphasis respectively, and with regard to the parts not detailed in a certain embodiment, reference can be made to related descriptions of other embodiments.

In the several embodiments provided by the present disclosure, it should be understood that the disclosed technical contents may be implemented in other methods. The device embodiments described above are merely illustrative. For example, the division of a unit or a module is only a logical function division. In actual implementation, there may be other division methods, for example, a plurality of units or modules or components may be combined, or may be integrated into another system, or some features can be ignored or not performed. In addition, the coupling or direct coupling or communication connection with each other shown or discussed may be an indirect coupling or communication connection through some interfaces, modules or units, and may be in electrical form or other forms.

The units or modules described as separate components may or may not be physically separated, and the components showed as units or modules may or may not be physical units or modules, and may be located in one place or may be distributed to a plurality of network units or modules. Some or all of the units or modules may be selected according to actual needs to achieve the purpose of the solution of the present embodiment.

In addition, the functional units or modules in embodiments of the present disclosure may be integrated in one processing unit or module, or the units or modules can be physically and separately present, or two or more units or modules can be integrated in one unit or module. The integrated unit or module above can be embodied in the form of hardware or in the form of a software function unit or module.

An integrated unit, if implemented in the form of a software function unit and sold or used as a stand-alone product, can be stored in a computer readable storage medium. On the basis of such understanding, the technical solution of the present disclosure or the portion of the technical solution of the present disclosure that contributes in essence to the prior art or all or part of the technical solution may be embodied in the form of a software product stored in a storage medium. Several instructions are included to cause a computer device (which may be a personal computer, server or network device, etc.) to perform all or part of the steps of the method of the embodiments of the present disclosure. The storage media above includes various media capable of storing program codes such as a USB flash disk, a read-only memory (ROM), a random access memory (RAM), a removable hard disk, a magnetic disk, or an optical disk, etc.

A person with ordinary skill in the art can be understood that all or part of the steps implementing the method of the embodiments above can be accomplished by a hardware (for example, circuit) related to program instructions, wherein the program above may be stored in a computer readable storage medium, and the program, when performed, performs the steps of the method of the embodiments above. The storage medium above includes various media capable of storing program codes such as a ROM, a RAM, a magnetic disk, or an optical disk.

From the description of the embodiments above, a person with ordinary skill in the art may understand clearly that the embodiments may be implemented using software and necessary general hardware platform, and of course also may be implemented using hardware. On the basis of such understanding, the technical solution above or the portion of the technical solution above that contributes in essence to the prior art may be embodied in the form of a software product stored in a computer readable storage medium, such as ROM/RAM, magnetic disk, or an optical disk, etc. Several instructions are included to cause a computer device (which may be a personal computer, server or network device, etc.) to perform the method of the embodiments or some portions of the embodiments.

The present disclosure may also be configured as follows:

(1) A method for evaluating projection content in an enclosed environment, comprising:

acquiring EEG data at a plurality of predetermined regions of the brain of a user, the EEG data being collected during the user watching the projection content;

extracting feature of the acquired EEGs at each of the predetermined regions, so as to obtain EEG energy values of a plurality of frequency bands of the EEGs at each of the predetermined regions;

determining, from the extracted EEG energy values, a plurality of EEG energy values respectively corresponding to a plurality of indexes for evaluating the projection content according to the correlations between the EEG energy values and the indexes;

calculating a projection content evaluation value according to each of the plurality of EEG energy values and corresponding weight in a plurality of weights respectively corresponding to the plurality of indexes; and evaluating the projection content using the projection content evaluation value.

(2) The method according to (1), before extracting feature of the acquired EEGs at each of the predetermined regions so as to obtain EEG energy values of a plurality of frequency bands of the EEGs at each of the predetermined regions, the method may further comprise: performing preprocessing including eye-movement noise removal on the EEG data.

(3) The method according to (1), calculating the projection content evaluation value according to each of the plurality of EEG energy values and corresponding weight in a plurality of weights respectively corresponding to the plurality of indexes comprises multiplying each of the plurality of EEG energy values by corresponding weight in a plurality of weights respectively corresponding to the plurality of indexes and accumulating the multiplication results of the plurality of EEG energy values, so as to calculate the projection content evaluation value.

(4) The method according to any one of (1) to (3), the indexes may comprise at least one of the following: emotional valence index, emotional arousal index, concentration index, fatigue index, motion sickness index, and preference index.

(5) The method according to any one of (1) to (4), the frequency bands may comprise at least one of the following: a theta frequency band with a frequency range of 4-7 Hz, an alpha frequency band with a frequency range of 8-13 Hz, a beta frequency band with a frequency range of 14-28 Hz, and a gamma frequency band with a frequency range of 29-50 Hz.

(6) The method according to any one of (1) to (5), the correlations between the EEG energy values and the indexes for evaluating the projection content may comprise at least one of the following:
  the asymmetry between the EEG energy values of alpha frequency band at the left prefrontal region and the EEG energy values of alpha frequency band at the right prefrontal region corresponding to the emotional valence index;
  the EEG energy values of alpha frequency band at the occipital region corresponding to the emotional arousal index;
  the EEG energy values of theta frequency band at the left prefrontal region and the EEG energy values of theta frequency band at the right prefrontal region together corresponding to the concentration index;
  the average EEG energy value of alpha frequency band at the parietal-occipital region corresponding to the fatigue index, wherein the average EEG energy value is the average value of the EEG energy values of alpha frequency band of all the EEGs collected at the parietal-occipital region;
  the EEG energy values of gamma frequency band at the occipital region corresponding to the motion sickness index; and
  the EEG energy values of theta frequency band at the right temporal region corresponding to the preference index.

(7) The method according to any one of (1) to (6), when the projection content comprises a plurality of different projection contents, the optimal projection content in the plurality of different projection contents is determined according to the projection content evaluation value of each of the plurality of different projection contents.

(8) The method according to any one of (1) to (7), the differences between the plurality of different projection contents at least comprise one of the following items of the projection content: hue, brightness, contrast, amplitude, transition rate, and complexity representing the number of the foregoing items.

(9) A device for evaluating projection content in an enclosed environment, comprising:
  an EEG data acquisition module, configured to acquire EEG data at a plurality of predetermined regions of the brain of a user, the EEG data being collected during the user watching the projection content;
  a feature extraction module, configured to extract feature of the acquired EEGs at each of the predetermined regions, so as to obtain EEG energy values of a plurality of frequency bands of the EEGs at each of the predetermined regions;
  an EEG energy value determination module, configured to determine, from the extracted EEG energy values, a plurality of EEG energy values respectively corresponding to a plurality of indexes for evaluating the projection content according to the correlations between the EEG energy values and the indexes;
  a projection content evaluation value calculation module, configured to calculate a projection content evaluation value according to each of the plurality of EEG energy values and corresponding weight in a plurality of weights respectively corresponding to the plurality of indexes; and
  a projection content evaluation module, configured to evaluate the projection content using the projection content evaluation value.

(10) The device according to (9), the device further comprises: a preprocessing module, configured to perform preprocessing including eye-movement noise removal on the EEG data.

(11) The device according to (9), wherein the projection content evaluation value calculation module is further configured to multiply each of the plurality of EEG energy values by corresponding weight in a plurality of weights respectively corresponding to the plurality of indexes and accumulate the multiplication results of the plurality of EEG energy values, so as to calculate the projection content evaluation value for evaluating the projection content.

(12) A machine readable storage medium storing a computer program comprising program instructions for performing, when being executed by a processor, the method according to any one of (1) to (8).

(13) A processor that is used for executing a program for performing, when the program is executed, the method according to any one of (1) to (8).

(14) A device for evaluating projection content in an enclosed environment, comprising: a memory and a processor, the processor being connected to the memory, the memory having program instructions performed by the processor stored therein, wherein when the processor performs the program instructions, the processor can perform the method according to any one of (1) to (8).

(15) A system for evaluating projection content in an enclosed environment, comprising: an EEG collection device, for collecting EEG data at a plurality of predetermined regions of the brain of a user during the user watching the projection content; and the device as described in (9) or (14) for evaluating projection content in an enclosed environment

(16) A computer program product comprising a computer program stored on a non-transitory machine readable storage medium, the computer program comprising program instructions for causing, when being executed by a computer, the computer to perform the method according to any one of (1) to (8).

The contents above are only preferred embodiments of the present disclosure. It should be noted that for a person with ordinary skill in the art, several improvements and modifications can also be made without departing from the principle of the present disclosure, and these improvements and modifications should also be considered as within the scope of protection of the present disclosure.

What is claimed is:

1. A computer-implemented method for evaluating projection content in an enclosed environment of an aircraft, comprising:
receiving, by at least one computer processor, electroencephalogram sensor data from an electroencephalogram collection device worn by a user and comprising a plurality of electrodes placed at a plurality of predetermined regions of a brain of the user, the electroencephalogram sensor data being collected during the user watching the projection content in the enclosed environment of the aircraft during different phases of air travel;
transforming, by a fast Fourier transform algorithm executed by the at least one computer processor, the electroencephalogram sensor data from a time domain to a frequency domain;
processing, by the at least one computer processor, the electroencephalogram sensor data in the frequency domain to extract electroencephalogram energy values of a plurality of frequency bands at each one of the predetermined regions of the brain of the user;
correlating, by the at least one computer processor, the electroencephalogram energy values of the frequency bands associated with each one of the predetermined regions of the brain of the user with a plurality of indexes corresponding to emotional valence, emotional arousal, concentration, fatigue, motion sickness, and preference of the user;
calculating, by the at least one computer processor, a projection content evaluation value by:
multiplying each one of the electroencephalogram energy values by a corresponding one of a plurality of weights corresponding to each one of the indexes; and
summing a plurality of weighted electroencephalogram energy values for all of the indexes,
wherein the weights are selected based on a contextual setting corresponding to each one of the different phases of air travel;
evaluating, by an algorithm executed by the at least one computer processor, the projection content using the projection content evaluation value, as weighted for all the indexes according to the contextual setting of air travel; and
modifying one or more design elements of a projection scheme of the projection content corresponding one of the different phases of air travel based on the evaluating the projection content evaluation value, as weighted for all the indexes according to the contextual setting of air travel.

2. The method according to claim 1, wherein:
before transforming, the method further comprises preprocessing, by the at least one computer processor, the electroencephalogram sensor data to remove eye-movement noise from the electroencephalogram sensor data using an independent component analysis method;
the method further comprises filtering, by the at least one computer processor, the electroencephalogram sensor data, with eye-movement noise removed; and
transforming is performed on the electroencephalogram sensor data, as filtered with eye-movement noise removed.

3. The method according to claim 1, wherein the frequency bands comprise at least one of the following:
a theta frequency band with a frequency range of 4-7 Hz, an alpha frequency band with a frequency range of 8-13 Hz, a beta frequency band with a frequency range of 14-28 Hz, and a gamma frequency band with a frequency range of 29-50 Hz.

4. The method according to claim 3, wherein correlations between the electroencephalogram energy values and the indexes for evaluating the projection content comprise:
an asymmetry between the electroencephalogram energy values of the alpha frequency band at a left prefrontal region and the electroencephalogram energy values of the alpha frequency band at a right prefrontal region corresponding to at least one of the indexes associated with emotional valence.

5. The method according to claim 3, wherein, correlations between the electroencephalogram energy values and the indexes for evaluating the projection content comprise:
the electroencephalogram energy values of the alpha frequency band at an occipital region corresponding to at least one of the indexes associated with emotional arousal.

6. The method according to claim 3, wherein, correlations between the electroencephalogram energy values and the indexes for evaluating the projection content comprise:
the electroencephalogram energy values of the theta frequency band at a left prefrontal region and the electroencephalogram energy values of the theta frequency band at a right prefrontal region together corresponding to at least one of the indexes associated with concentration.

7. The method according to claim 3, wherein, correlations between the electroencephalogram energy values and the indexes for evaluating the projection content comprise:
an average electroencephalogram energy value of the alpha frequency band at a parietal-occipital region corresponding to at least one of the indexes associated with fatigue,
wherein the average electroencephalogram energy value is an average value of the electroencephalogram energy values of the alpha frequency band of all the electroencephalogram sensor data collected at the parietal-occipital region.

8. The method according to claim 3, wherein, correlations between the electroencephalogram energy values and the indexes for evaluating the projection content comprise:
the electroencephalogram energy values of the gamma frequency band at an occipital region corresponding to a at least one of the indexes associated with motion sickness.

9. The method according to claim 3, wherein, correlations between the electroencephalogram energy values and the indexes for evaluating the projection content comprise:
the electroencephalogram energy values of the theta frequency band at a right temporal region corresponding to at least one of the indexes associated with preference.

10. The method according to claim 3, wherein correlations between the electroencephalogram energy values and the indexes for evaluating the projection content comprise at least two of:
an asymmetry between the electroencephalogram energy values of the alpha frequency band at a left prefrontal region and the electroencephalogram energy values of the alpha frequency band at a right prefrontal region corresponding to at least one of the indexes associated with emotional valence;

the electroencephalogram energy values of the alpha frequency band at an occipital region corresponding to at least one of the indexes associated with emotional arousal;

the electroencephalogram energy values of the theta frequency band at the left prefrontal region and the electroencephalogram energy values of the theta frequency band at the right prefrontal region, together corresponding to at least one of the indexes associated with concentration;

an average of the electroencephalogram energy values of the alpha frequency band at a parietal-occipital region corresponding to at least one of the indexes associated with fatigue;

the electroencephalogram energy values of the gamma frequency band at the occipital region corresponding to at least one of the indexes associated with motion sickness; and the electroencephalogram energy values of the theta frequency band at a right temporal region corresponding to at least one of the indexes associated with preference.

11. The method according to claim 1, further comprising determining, when the projection content comprises a plurality of different projection contents, an optimal projection content in the plurality of different projection contents according to the projection content evaluation values of each of the plurality of different projection contents.

12. The method according to claim 1, wherein modifying comprises changing at least one of hue, brightness, contrast, amplitude, transition rate, speed, and complexity of the projection scheme.

13. A non-transitory machine readable storage medium storing a computer program comprising program instructions for performing, when being executed by the at least one computer processor, the method according to claim 1.

14. A computer program product comprising program instructions stored on a non-transitory computer readable storage medium, the program instructions, when executed by a computer, cause the computer to perform the method according to claim 1.

15. The method according to claim 1, further comprising filtering, by the at least one computer processor, the electroencephalogram sensor data using an approximately 0.05 Hz to 50 Hz band-pass filter.

16. A device for evaluating projection content in an enclosed environment of an aircraft, comprising:
an electroencephalogram collection device configured to be worn by a user and comprising a plurality of electrodes configured for placement at a plurality of predetermined regions of a brain of the user and configured to collect electroencephalogram sensor data from the plurality of predetermined regions of the brain of the user; and
at least one computer processor configured to:
receive the electroencephalogram sensor data from the electroencephalogram collection device during the user watching the projection content in the enclosed environment of the aircraft during different phases of air travel;
transform, by execution of a fast Fourier transform algorithm, the electroencephalogram sensor data from a time domain to a frequency domain;
process the electroencephalogram sensor data in the frequency domain to extract electroencephalogram energy values of a plurality of frequency bands at each one of the predetermined regions of the brain of the user;
correlate the electroencephalogram energy values of the frequency bands associated with each one of the predetermined regions of the brain of the user with a plurality of indexes corresponding to emotional valence, emotional arousal, concentration, fatigue, motion sickness, and preference of the user;
calculate a projection content evaluation value by:
multiplying each one of electroencephalogram energy values by a corresponding one of a plurality of weights corresponding to each one of the indexes; and
summing a plurality of weighted electroencephalogram energy values for all of the indexes,
wherein the weights are selected based on a contextual setting corresponding to each one of the different phases of air travel;
evaluate the projection content using the projection content evaluation value, as weighted for all the indexes according to the contextual setting of air travel; and
modify one or more design elements of a projection scheme of the projection content corresponding one of the different phases of air travel based on the evaluating the projection content evaluation value, as weighted for all the indexes according to the contextual setting of air travel.

17. The device according to claim 16, wherein:
the at least one computer processor is further configured to:
preprocess the electroencephalogram sensor data to remove eye-movement noise from the electroencephalogram sensor data; and
filter the electroencephalogram sensor data, with eye-movement noise removed; and
transformation is performed on the electroencephalogram sensor data, as filtered with eye-movement noise removed.

18. The device according to claim 16, wherein the design elements of the projection scheme of the projection content comprises at least one of hue, brightness, contrast, amplitude, transition rate, speed, and complexity of the projection scheme.

19. The device according to claim 16, wherein correlations between the electroencephalogram energy values and the indexes for evaluating the projection content comprise at least two of:
an asymmetry between the electroencephalogram energy values of the alpha frequency band at a left prefrontal region and the electroencephalogram energy values of the alpha frequency band at a right prefrontal region corresponding to at least one of the indexes associated with emotional valence;
the electroencephalogram energy values of the alpha frequency band at an occipital region corresponding to at least one of the indexes associated with emotional arousal;
the electroencephalogram energy values of the theta frequency band at the left prefrontal region and the electroencephalogram energy values of the theta frequency band at the right prefrontal region together corresponding to at least one of the indexes associated with concentration;

an average of the electroencephalogram energy values of the alpha frequency band at a parietal-occipital region corresponding to at least one of the indexes associated with fatigue;

the electroencephalogram energy values of the gamma frequency band at the occipital region corresponding to at least one of the indexes associated with motion sickness; and the electroencephalogram energy values of the theta frequency band at a right temporal region corresponding to at least one of the indexes associated with preference.

20. The device according to claim 16, wherein the at least one computer processor is further configured to filter the electroencephalogram sensor data using an approximately 0.05 Hz to 50 Hz band-pass filter.

* * * * *